US011623692B2

(12) United States Patent
Eklund et al.

(10) Patent No.: US 11,623,692 B2
(45) Date of Patent: Apr. 11, 2023

(54) DEFORMABLE REAR CROSSMEMBERS WITH SPECIAL EXTRUSION SECTION DESIGN FOR BENDING DOWN IN CRASH LOADCASES

(71) Applicant: Volvo Car Corporation, Gothenburg (SE)

(72) Inventors: Johan Eklund, Gothenburg (SE); Anders Sandahi, Gothenburg (SE); Jens Raine, Varberg (SE); Domenico Macri, Gothenburg (SE); Emil Claesson, Gothenburg (SE); Per Zachrison, Gothenburg (SE); Kaldon Kalasho, Härryda (SE); Robin Larsson, Gothenburg (SE); Martin Granlund, Gothenburg (SE); Patrik Ulf Daniel Ljungbäck, Gothenburg (SE)

(73) Assignee: VOLVO CAR CORPORATION, Gothenburg (SE)

( * ) Notice: Subject to any disclaimer, the term of this patent is extended or adjusted under 35 U.S.C. 154(b) by 96 days.

(21) Appl. No.: 17/372,146

(22) Filed: Jul. 9, 2021

(65) Prior Publication Data
US 2023/0010145 A1    Jan. 12, 2023

(51) Int. Cl.
*B60J 7/00*    (2006.01)
*B62D 21/15*    (2006.01)
*B62D 29/00*    (2006.01)

(52) U.S. Cl.
CPC ......... *B62D 21/155* (2013.01); *B62D 29/008* (2013.01)

(58) Field of Classification Search
CPC ......... B29C 48/08; B29C 48/09; B29C 48/10; B29C 48/919; B62D 25/145; G09G 2330/021; G09G 2320/0261; G09G 2320/0252; H04L 5/0053; H04L 5/0007
See application file for complete search history.

(56) References Cited

U.S. PATENT DOCUMENTS

| | | | |
|---|---|---|---|
| 9,394,002 B2 * | 7/2016 | Uicker | B23K 20/227 |
| 9,428,129 B2 | 8/2016 | Crona et al. | |
| 9,902,428 B2 * | 2/2018 | Murata | B62D 21/155 |
| 10,940,891 B2 * | 3/2021 | Eklund | B21C 23/142 |
| 11,247,726 B2 * | 2/2022 | Eklund | B60G 7/02 |
| 2003/0085579 A1 | 5/2003 | Seksaria et al. | |

(Continued)

FOREIGN PATENT DOCUMENTS

EP    2921377 B1    9/2015
KR    20160045500 B1    4/2016

*Primary Examiner* — Kiran B Patel
(74) *Attorney, Agent, or Firm* — Amin, Turocy & Watson, LLP

(57) ABSTRACT

A support extrusion for a subframe structure of a vehicle and methods of fabricating the same. In one example, a support extrusion can comprise a multicell structure that facilitates coupling the support extrusion with a rear crossmember of the subframe structure. The multicell structure can comprise a front cell column and a rear cell column that intervenes between the front cell column and the rear crossmember in a longitudinal direction of the subframe structure. The front cell column can comprise a trigger that facilitates plastically deforming the front cell column downward in a vertical direction of the subframe structure when subjected to impact forces of a frontal crash.

20 Claims, 7 Drawing Sheets

(56) References Cited

U.S. PATENT DOCUMENTS

| | | | |
|---|---|---|---|
| 2019/0351946 A1* | 11/2019 | Eklund | B62D 27/023 |
| 2019/0351947 A1* | 11/2019 | Eklund | B62D 27/023 |
| 2021/0188359 A1* | 6/2021 | Eklund | B62D 29/008 |
| 2021/0291904 A1* | 9/2021 | Eklund | B62D 21/03 |
| 2021/0300471 A1* | 9/2021 | Eklund | B60G 3/14 |
| 2022/0126920 A1* | 4/2022 | Eklund | B60G 3/14 |

* cited by examiner

DEFORMABLE REAR CROSSMEMBERS WITH SPECIAL EXTRUSION SECTION DESIGN FOR BENDING DOWN IN CRASH LOADCASES

FIELD

The subject disclosure generally relates to the automotive field, and more specifically, to a subframe structure for a vehicle.

BACKGROUND

Vehicles can be equipped with safety devices to enhance passenger safety and mitigate negative effects associated with crashes or collisions. Examples of such safety devices within an occupant compartment of a vehicle can include seatbelts, airbags, and the like. Vehicles can also be equipped with safety devices external to an occupant compartment that can enhance passenger safety and mitigate negative effects associated with crashes. One such safety device external to the occupant compartment is a bumper. Bumpers generally function to mitigate negative effects of relatively low impact crashes. Vehicle chassis and related components generally function to mitigate negative effects of higher impact crashes. While important, crash safety is generally one of a number of considerations involved in the design of a vehicle. For example, weight reduction can be important for efficiency considerations. Managing trade-offs associated with the number of considerations involved in the design of a vehicle without compromising on crash safety dictates an ongoing desire for improved safety devices that enhance passenger safety and mitigate negative effects associated with crashes or collisions.

SUMMARY

The following presents a summary to provide a basic understanding of one or more embodiments of the invention. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, a support extrusion for a subframe structure of a vehicle and methods of fabricating the same are described.

According to an embodiment, a support extrusion for a subframe structure of a vehicle. The support extrusion can comprise a multicell structure that facilitates coupling the support extrusion with a rear crossmember of the subframe structure. The multicell structure can comprise a front cell column and a rear cell column that intervenes between the front cell column and the rear crossmember in a longitudinal direction of the subframe structure. The front cell column can comprise a trigger that facilitates plastically deforming the front cell column downward in a vertical direction of the subframe structure when subjected to impact forces of a frontal crash.

According to another embodiment, a subframe structure for a vehicle can comprise a rear crossmember and a support extrusion. The rear crossmember can extend in a transverse direction of the subframe structure. The support extrusion can comprise a multicell structure that facilitates coupling the support extrusion with the rear crossmember. The multicell structure can comprise a front cell column and a rear cell column that intervenes between the front cell column and the rear crossmember in a longitudinal direction of the subframe structure. The front cell column can comprise a trigger that facilitates plastically deforming the front cell column downward in a vertical direction of the subframe structure when subjected to impact forces of a frontal crash.

According to an additional embodiment, a vehicle can comprise a subframe structure with a support extrusion. The support extrusion can comprise a multicell structure that facilitates coupling the support extrusion with a rear crossmember of the subframe structure. The multicell structure can comprise a front cell column and a rear cell column that intervenes between the front cell column and the rear crossmember in a longitudinal direction of the subframe structure. The front cell column can comprise a trigger that facilitates plastically deforming the front cell column downward in a vertical direction of the subframe structure when subjected to impact forces of a frontal crash.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details. It will be understood that when an element is referred to as being "coupled" to another element, it can describe one or more different types of coupling including, but not limited to, chemical coupling, communicative coupling, capacitive coupling, electrical coupling, electromagnetic coupling, inductive coupling, operative coupling, optical coupling, physical coupling, thermal coupling, and/or another type of coupling.

Figure 1:
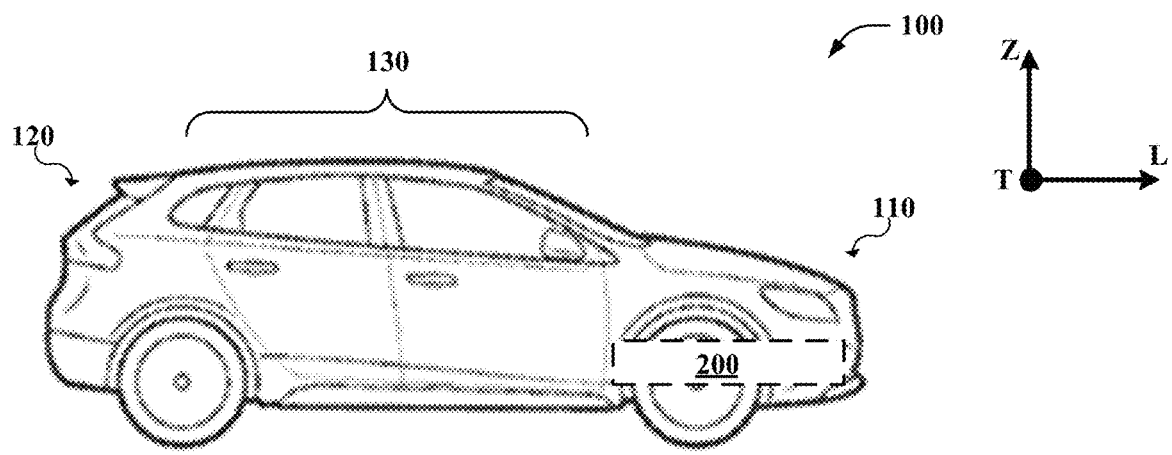
FIG. 1 illustrates an example, non-limiting vehicle, in accordance with one or more embodiments described herein.

FIG. 1 illustrates an example, non-limiting vehicle 100, in accordance with one or more embodiments described herein. As shown by FIG. 1, vehicle 100 can comprise a front section 110, a rear section 120 that longitudinally opposes front section 110, and a user compartment 130 that intervenes between front section 110 and rear section 120. Vehicle 100 can further comprise a subframe structure 200 positioned proximate to front section 110 such that the subframe structure 200 precedes user compartment 130 in a longitudinal direction L.

Figure 2:
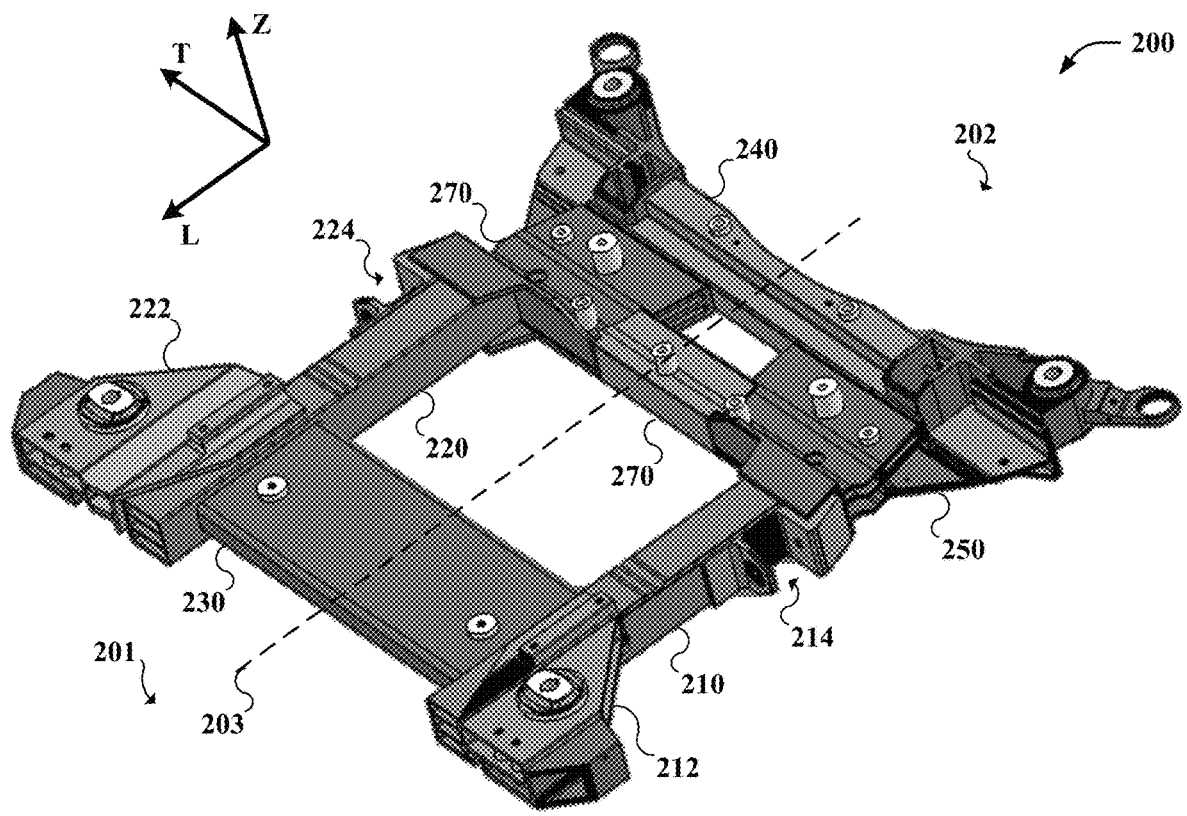
FIG. 2 illustrates an isometric view of an example, non-limiting subframe structure, in accordance with one or more embodiments described herein.
Figure 3:
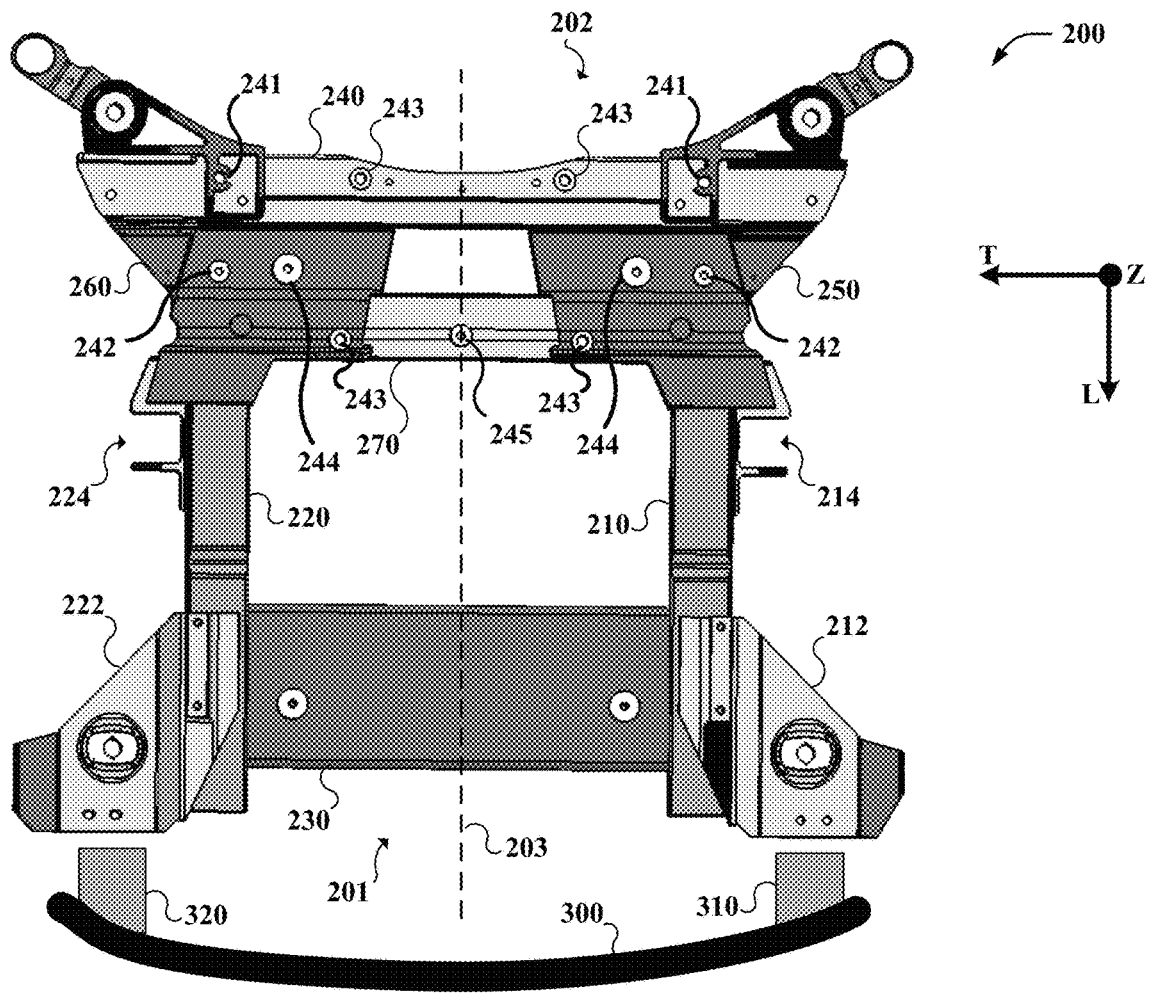
FIG. 3 illustrates a top view of the example, non-limiting subframe structure of FIG. 2, in accordance with one or more embodiments described herein.
Figure 4:
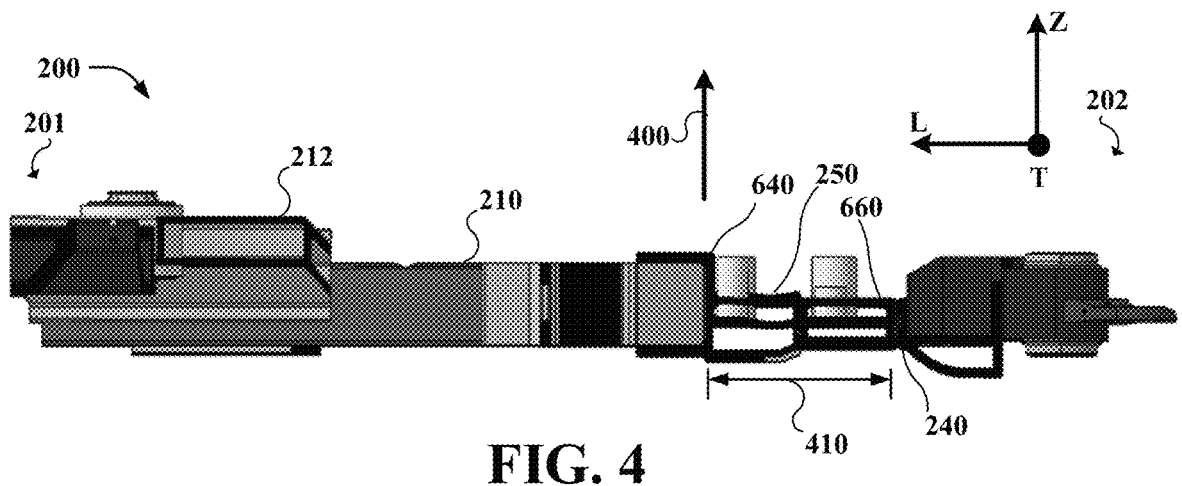
FIG. 4 illustrates a side view of the example, non-limiting subframe structure of FIG. 2, in accordance with one or more embodiments described herein.

FIGS. 2-4 illustrate views of an example, non-limiting subframe structure 200 for a vehicle (e.g., vehicle 100 of FIG. 1). In particular, FIG. 2 illustrates an isometric view depicting subframe structure 200, FIG. 3 illustrates a top view depicting subframe structure 200, and FIG. 4 illustrates a side view depicting subframe structure 200. With reference to FIGS. 2-4, subframe structure 200 can comprise longitudinal member 210 and longitudinal member 220 that can be offset from longitudinal member 210 in a transverse direction T. Subframe structure 200 can further comprise a front crossmember 230 and a rear crossmember 240 that can be offset from the front crossmember 230 in a longitudinal direction L. Front crossmember 230 can be connectable to longitudinal member 210 and longitudinal member 220 at a front section 201 of subframe structure 200. Rear crossmember 240 can be connectable to longitudinal member 210 and longitudinal member 220 at a rear section 202 of subframe structure 200 via support extrusion 250 and support extrusion 260, respectively. Support extrusion 250 will be described in greater detail below with respect to FIGS. 6-11. In an embodiment, support extrusion 260 can be symmetrical to support extrusion 250 with respect to a longitudinal axis 203 of subframe structure 200.

Subframe structure 200 can further comprise a number of brackets and/or connection points that can facilitate coupling various vehicle components to subframe structure 200. For example, subframe structure 200 can further comprise brackets 212 and 222 that can facilitate coupling subframe structure 200 to a bumper 300 at the front section 201 of subframe structure 200. To that end, a connection member 310 of bumper 300 can be connectable to bracket 212 and a connection member 320 of bumper 300 can be connectable to bracket 222, as best seen in FIG. 3. Bumper 300 can facilitate distributing impact forces of a frontal crash involving the vehicle. As another example, subframe structure 200 can further comprise brackets 214 and 224 that can facilitate coupling subframe structure 200 to link arms (not shown) for an axle of the vehicle.

Figure 5:
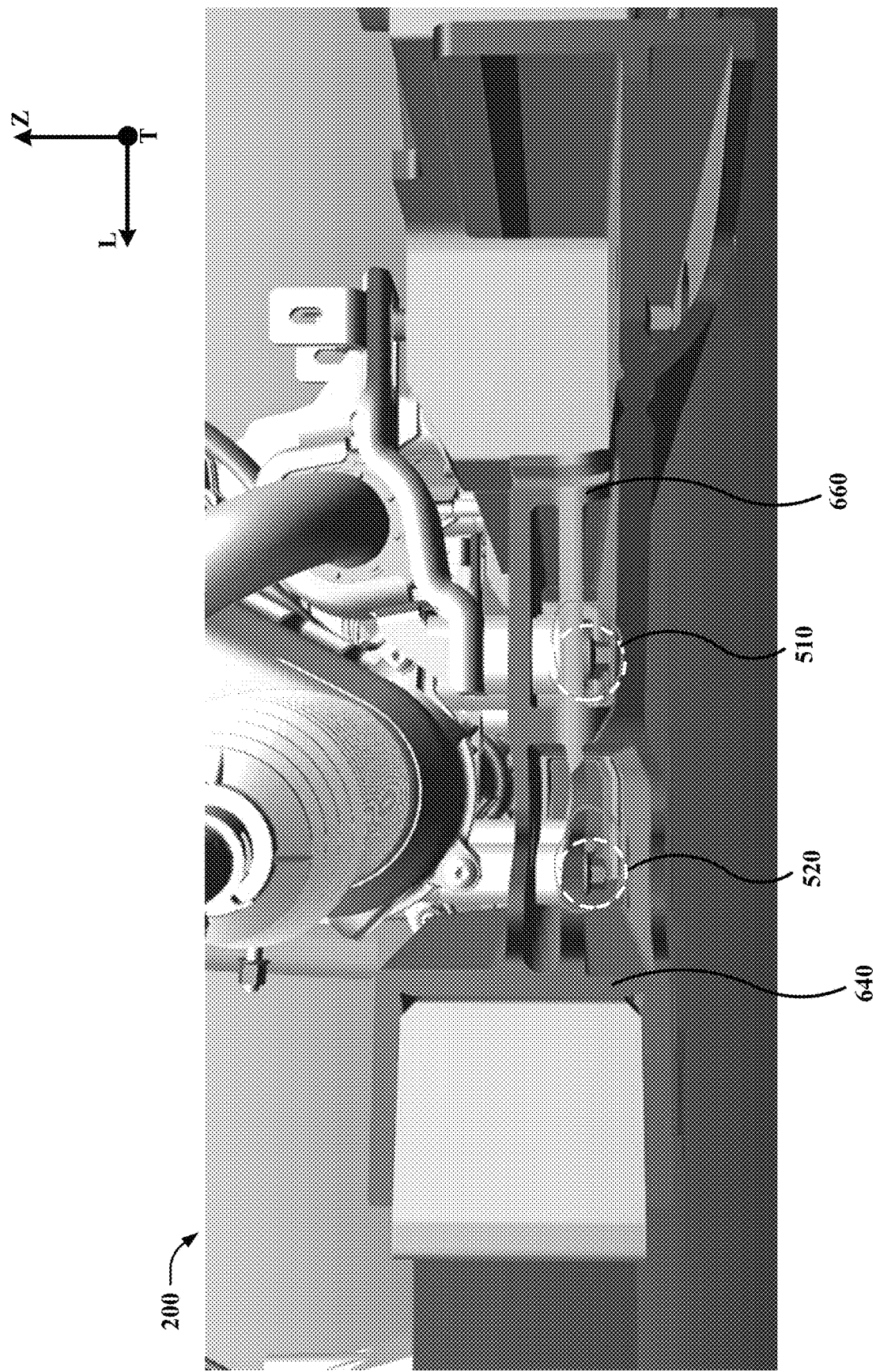
FIG. 5 illustrates a close-up, side view of the example, non-limiting subframe structure of FIG. 2, in accordance with one or more embodiments described herein.

Subframe structure 200 can further comprise connection points 241 that can facilitate coupling subframe structure 200 with rear fixation portions of an anti-roll bar (not shown) of the vehicle. Connection points 242 of subframe structure 200 can facilitate coupling subframe structure 200 with front fixation portions of that anti-roll bar. For example, FIG. 5 illustrates a coupling mechanism 510 coupling a front fixation portion of an anti-roll bar with subframe structure 200 via connection point 242. A propulsion motor or engine (not shown) can be coupled to subframe structure 200 via connection points 243. For example, FIG. 5 illustrates a coupling mechanism 520 coupling a propulsion motor or engine (not shown) to subframe structure via connection point 243. A steering gear (not shown) can be coupled to subframe structure 200 via connection points 244. Subframe structure 200 can further comprise a crossmember 270 with a connection point 245 that facilitates coupling subframe structure 200 with a middle fixation portion of that steering gear.

Figure 6:
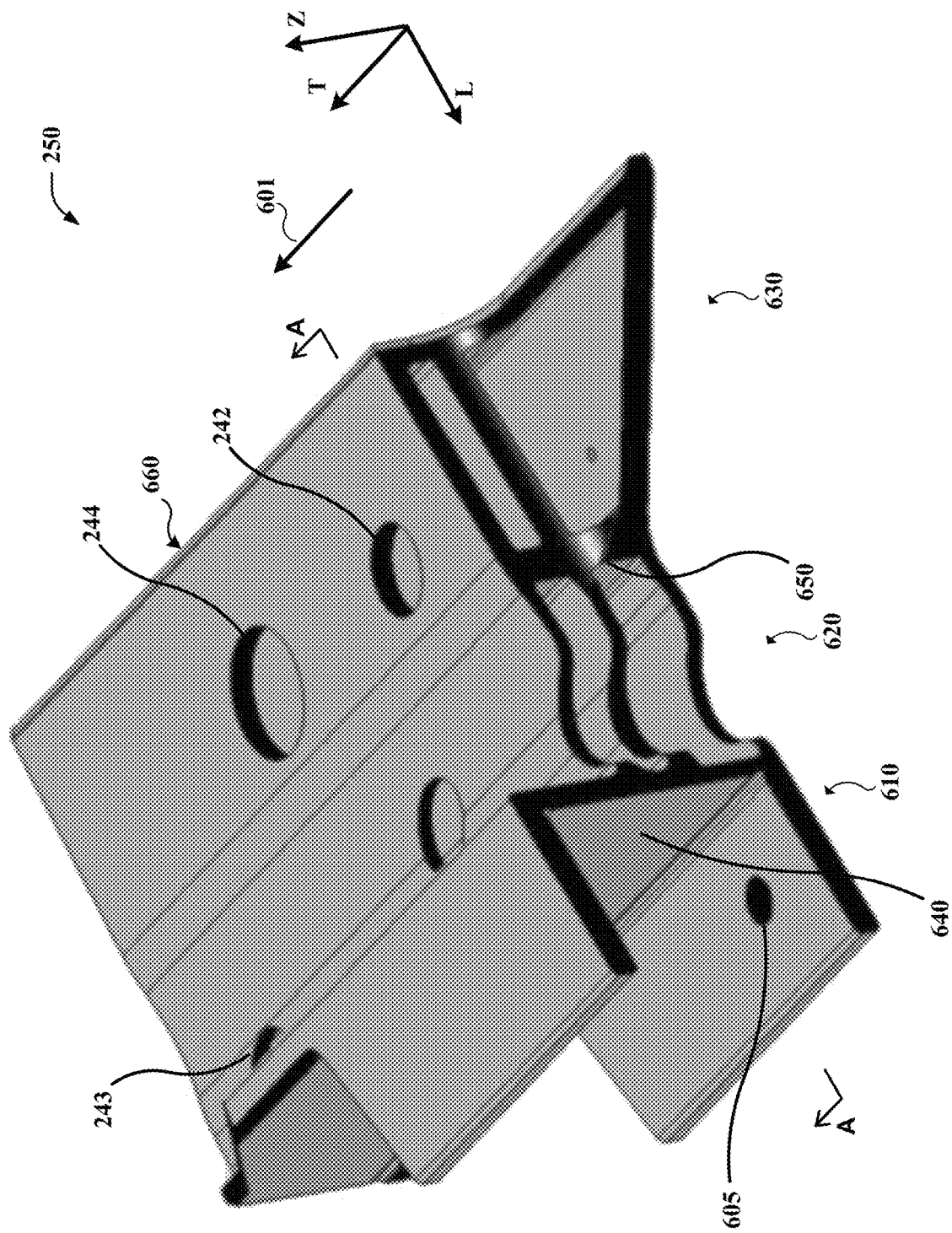
FIG. 6 illustrates an isometric view of an example, non-limiting support extrusion, in accordance with one or more embodiments described herein.
Figure 7:
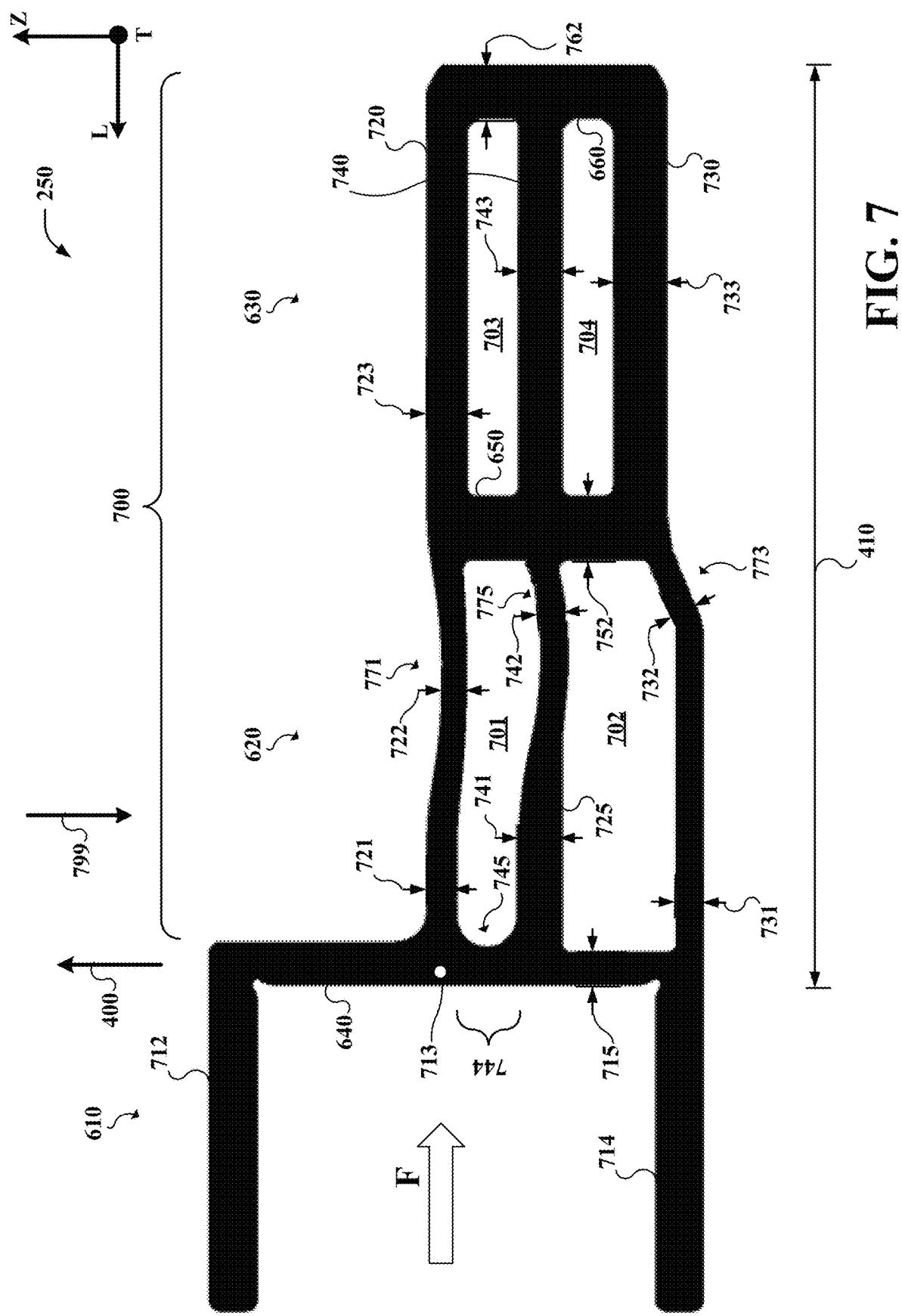
FIG. 7 illustrates a cross-sectional view of the example, non-limiting support extrusion of FIG. 6 taken along line A-A, in accordance with one or more embodiments described herein.

With reference to FIGS. 6-7, support extrusion 250 can comprise a bracket portion 610 that can facilitate coupling support extrusion 250 with longitudinal member 210 of subframe structure 200. To that end, longitudinal member 210 can be received between an upper wall 712 and a lower wall 714 of bracket portion 610. Support extrusion 250 can further comprise a multicell structure 700 that can be defined in the longitudinal direction L of subframe structure 200 by front wall 640 and rear wall 660. Divider wall 650 of support extrusion 250 can partition multicell structure 700 into a front cell column 620 and a rear cell column 630. Rear cell column 630 can intervene between front cell column 620 and rear crossmember 240 in the longitudinal direction L. Multicell structure 700 can facilitate coupling support extrusion 250 with rear crossmember 240 of subframe structure 200. To that end, rear wall 660 can be attached to rear crossmember 240 via welding, bolting, and/or other attachment means.

As best seen in FIG. 6, support extrusion 250 can be extruded in a direction represented by arrow 601 that is substantially parallel to the transverse direction T. That is, support extrusion 250 can be an object created using an extrusion process. Such extrusion processes can involve applying a compressive force (e.g., in the direction represented by arrow 601) to push a material through a die of a desired cross-section to create an object with a fixed cross-sectional profile that can substantially conform with the desired cross-section. Using such extrusion processes, support extrusion 250 can be created with the substantially fixed cross-sectional profile shown in FIG. 7. In an embodiment, creating support extrusion 250 using such extrusion processes can facilitate reducing a brittleness of support extrusion 250. For example, a support extrusion obtained from an extrusion process can be less brittle than a support extrusion obtained from a casting process. In an embodiment, creating support extrusion 250 using such extrusion processes can facilitate reducing manufacturing complexity and/or costs. In an embodiment, the material that such extrusion processes consume to create support extrusion 250 can be an aluminum alloy. Example aluminum alloys can include, but not be limited to, a 6063 aluminum alloy, a 6082 aluminum alloy, a 6005 aluminum alloy, and/or other aluminum alloys. In an embodiment, forming a support extrusion using an aluminum alloy can facilitate weight reduction and/or improved ductility relative to forming a support extrusion using other materials (e.g., steel).

As best seen in FIG. 7, multicell structure 700 can further comprise multiple substantially horizontal walls. Those substantially horizontal walls can comprise an upper wall 720 and a lower wall 730 that can define multicell structure 700 in the vertical direction Z. In an embodiment, upper wall 720 within front cell column 620 can extend longitudinally from bracket portion 610 proximate to a midpoint 713 of bracket portion 610 in the vertical direction Z. Those substantially horizontal walls can further comprise an intermediate wall 740 that can vertically oppose upper wall 720 and lower wall 730. Within front cell column 620, intermediate wall 740 can separate cell 701 and cell 702 that comprise front cell column 620 in the vertical direction Z. Within rear cell column 630, intermediate wall 740 can separate cell 703 and cell 704 that comprise rear cell column 630 in the vertical direction Z. In the embodiment illustrated by FIG. 7, multicell structure 700 is shown as comprising one intermediate wall (e.g., intermediate wall 740). In other embodiments, multicell structure 700 can comprise more (e.g., two) intermediate walls.

Front cell column 620 of multicell structure 700 can comprise one or more triggers that can facilitate plastically deforming front cell column 620 downward (e.g., in a direction of arrow 799) in the vertical direction Z when subjected to impact forces of a frontal crash. In an embodiment, a "trigger" can denote a feature of front cell column 620 that can facilitate plastically deforming front cell column 620 downward in a controlled manner. In FIG. 7, front cell column 620 comprises three such triggers (e.g., trigger 771 in upper wall 720, trigger 773 in lower wall 730, and/or trigger 775 in intermediate wall 740). In other embodiments, front cell column 620 can comprise fewer (e.g., two) or more (e.g., four) triggers.

In FIG. 7, triggers 771, 773, and 775 can be implemented as curvatures in upper wall 720, lower wall 730, and intermediate wall 740, respectively. In some instances, a trigger can be implemented as a curvature by reducing wall thicknesses extending in the vertical direction Z within front cell column 620 proximate to divider wall 650. For example, within front cell column 620, upper wall 720 can be reduced from a thickness 721 (e.g., 5.5 millimeter (mm)) proximate to front wall 640 to a thickness 722 (e.g., 4.52 mm) proximate to divider wall 650 to implement trigger 771. In an embodiment, thickness 722 can correspond with a lowest wall thickness extending in the vertical direction Z within support extrusion 250. As another example, within front cell column 620, intermediate wall 740 can be reduced from a thickness 741 (e.g., 8 mm) proximate to front wall 640 to a thickness 742 (e.g., 5 mm) proximate to divider wall 650 to implement trigger 775.

In some instances, a trigger can be implemented as a curvature by offsetting a substantially horizontal wall within front cell column 620 in the vertical direction Z with respect to the substantially horizontal wall within rear cell column 630. For example, trigger 773 can be implemented as a curvature by offsetting lower wall 730 within front cell column 620 in the vertical direction Z with respect to lower wall 730. As shown by FIG. 7, implementing trigger 773 as a curvature by offsetting lower wall 730 in the vertical direction Z can position lower wall 730 within front cell column 620 below lower wall 730 within rear cell column 630. In an embodiment, implementing a trigger as a curvature by offsetting a substantially horizontal wall in the vertical direction Z within front cell column 620 can further involve maintaining a substantially constant wall thickness in the vertical direction Z within front cell column 620. For example, a thickness 731 (e.g., 5.5 mm) of lower wall 730 proximate to front wall 640 can be substantially consistent with a thickness 732 (e.g., 5.5 mm) of lower wall 730 proximate to divider wall 650. As discussed above, triggers 771, 773, and 775 can be implemented as curvatures in upper wall 720, lower wall 730, and intermediate wall 740, respectively. In other embodiments, one or more triggers of front cell column 620 can be implemented using other features (e.g., an indentation, a recess, and the like) in upper wall 720, lower wall 730, and/or intermediate wall 740.

In an embodiment, a wall segment 744 of front wall 640 that intervenes between upper wall 720 and intermediate wall 740 within front cell column 620 can comprise a radius of curvature 745. In an embodiment, radius of curvature 745 can facilitate substantially even distribution of impact forces (indicated in FIG. 7 by arrow F) of a frontal crash between upper wall 720 and intermediate wall 740.

A comparison between FIGS. 4 and 8-11 illustrates an example of how one or more triggers of multicell structure 700 can facilitate plastically deforming front cell column 620 when subjected to impact forces F of a frontal crash. The following examples describe the frontal crash in terms of a frontal crash for illustrative purposes. Embodiments of the present disclosure can facilitate mitigating impact forces F of other types of crashes involving a vehicle, such as a rear crash, a full-frontal crash, a crash involving a mobile progressive deformable barrier, and other types of crashes involving a vehicle. In this example, FIG. 4 illustrates a side view depicting subframe structure 200 prior to being subjected to impact forces of a frontal crash. That is, FIG. 4 can correspond to subframe structure 200 in a non-deformed (e.g., factory-condition) state. In the non-deformed state shown by FIG. 4, front wall 640 can comprise a substantially vertical orientation represented by arrow 400.

Figure 8:
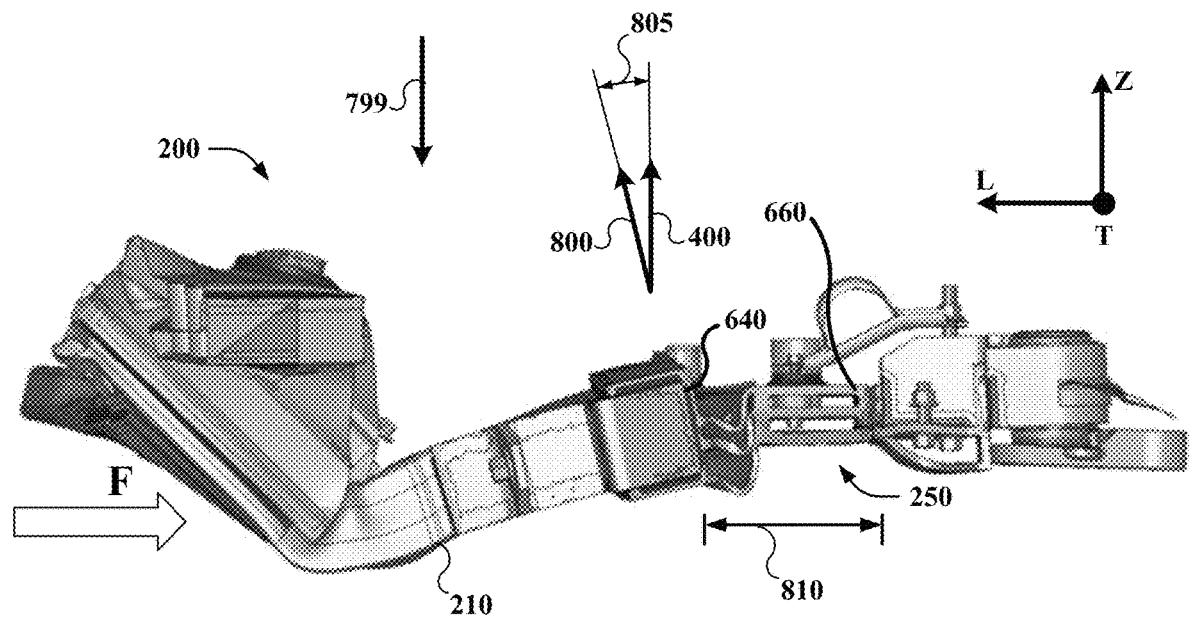
FIG. 8 illustrates a side view of the example, non-limiting subframe structure of FIG. 2 at a first time subsequent to being subjected to impact forces of a frontal crash, in accordance with one or more embodiments described herein.

FIG. 8 illustrates a side view depicting subframe structure 200 at a first time subsequent to being subjected to impact forces F of a frontal crash. For example, FIG. 8 can correspond to subframe structure 200 in a deformed state approximately 60 milliseconds (ms) after being subjected to impact forces F of an offset deformable barrier approaching subframe structure 200 at approximately a 45-degree angle. In the deformed state shown by FIG. 8, front cell column 620 is plastically deformed proximate to triggers 771, 773, and/or 775 downward (e.g., in the direction of arrow 799) in the vertical direction Z when subjected to impact forces F of the frontal crash. Between the non-deformed state shown by FIG. 4 and the deformed state shown by FIG. 8, an orientation of front wall 640 transitioned from the substantially vertical orientation represented by arrow 400 to the orientation represented by arrow 800 by action of that plastic deformation of front cell column 620. In addition to transitioning the orientation of front wall 640, front wall 640 has transitioned longitudinally towards rear wall 660 by action of that plastic deformation of front cell column 620. From such longitudinal transitioning of front wall 640, a distance between front wall 640 and rear wall 660 can decrease from the distance 410 of the non-deformed state shown by FIG. 4 to the distance 810 of the deformed state shown by FIG. 8.

Figure 9:
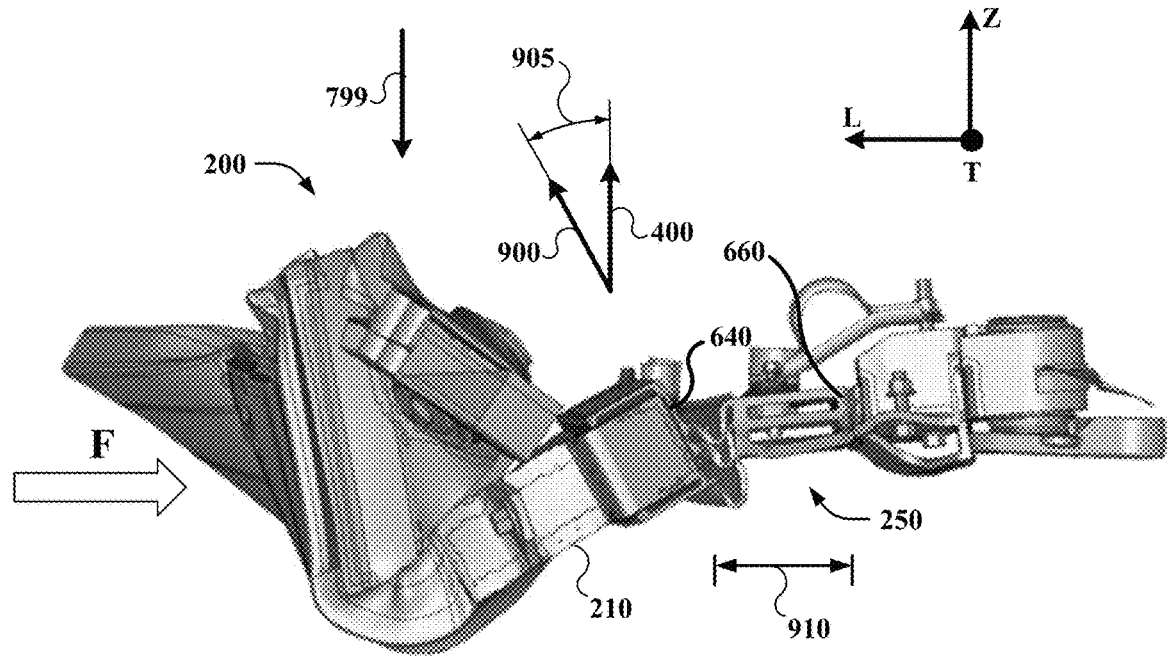
FIG. 9 illustrates a side view of the example, non-limiting subframe structure of FIG. 2 at a second time following the first time of FIG. 8, in accordance with one or more embodiments described herein.

FIG. 9 illustrates a side view depicting subframe structure 200 at a second time following the first time of FIG. 8. For example, FIG. 9 can correspond to subframe structure 200 in a deformed state approximately 75 ms after being further subjected to the impact forces F of the offset deformable barrier approaching subframe structure 200 at approximately the 45-degree angle. In the deformed state shown by FIG. 9, additional plastic deformation has occurred in front cell column 620 proximate to triggers 771, 773, and/or 775 downward (e.g., in the direction of arrow 799) in the vertical direction Z at the second time. Between the first time of FIG. 8 and the second time of FIG. 9, the orientation of front wall 640 has further transitioned from the substantially vertical orientation represented by arrow 400 of FIG. 4 to the orientation represented by arrow 900 by action of that additional plastic deformation of front cell column 620. That is, an angle 905 at the second time between the substantially vertical orientation represented by arrow 400 and the orientation represented by arrow 900 can be greater than an angle 805 at the first time between that substantially vertical orientation and the orientation represented by arrow 800.

In addition to further transitioning the orientation of front wall 640, front wall 640 has further transitioned longitudinally towards rear wall 660 by action of that additional plastic deformation of front cell column 620. From such further longitudinal transitioning of front wall 640, a distance between front wall 640 and rear wall 660 can decrease from the distance 410 of the non-deformed state shown by FIG. 4 to the distance 910 of the deformed state shown by FIG. 9. A comparison between FIGS. 8 and 9 illustrates that the distance 910 at the second time shown by FIG. 9 can be less than the distance 810 at the first time shown by FIG. 8. By transitioning the orientation of front wall 640 from the substantially vertical orientation represented by arrow 400 and/or by decreasing longitudinally transitioning front wall 640 towards rear wall 660, plastically deforming front cell column 620 can facilitate absorbing the impact forces F of the frontal crash.

Rear cell column 630 can facilitate minimizing a risk that support extrusion 250 detaches or dissociates from subframe structure 200 when subjected to impact forces F of a frontal collision. To that end, a structural integrity of rear cell column 630 can remain substantially intact when subjected to the impact forces F, as shown by FIGS. 8-11. One aspect of rear cell column 630 that can facilitate maintaining its structural integrity when subjected to the impact forces F can relate to wall thicknesses extending in the vertical direction Z. As best seen in FIG. 7, a substantially horizontal wall of multicell structure 700 within rear cell column 630 can comprise a thickness extending in the vertical direction Z that exceeds a respective thickness of the substantially horizontal wall within front cell column 620. For example, a thickness 723 (e.g., 7.5 mm) of upper wall 720 within rear cell column 630 can exceed a thickness 721 (e.g., 5.5 mm) of upper wall 720 within front cell column 620. As another example, a thickness 733 (e.g., 10 mm) of lower wall 730 within rear cell column 630 can exceed a thickness 731 (e.g., 5 mm) of lower wall 730 within front cell column 620. As another example, a thickness 743 (e.g., 8.569 mm) of intermediate wall 740 within rear cell column 630 can exceed a thickness 741 (e.g., 8 mm) of intermediate wall 740 within front cell column 620.

Another aspect of rear cell column 630 that can facilitate maintaining its structural integrity when subjected to the impact forces F can relate to wall thicknesses extending in the longitudinal direction L. For example, rear wall 660 can comprise a thickness 762 (e.g., 10 mm) in the longitudinal direction L. In an embodiment, the thickness 762 of rear wall 660 can in the longitudinal direction L can facilitate providing a robust interface between support extrusion 250 and rear crossmember 240 of subframe structure 200. As another example, divider wall 650 can comprise a thickness 752 (e.g., 12 mm) extending in the longitudinal direction L. In an embodiment, the thickness 752 of divider wall 650 extending in the longitudinal direction L can exceed respective thicknesses of other walls comprising support extrusion 250. In an embodiment, the thickness 752 of divider wall 650 can correspond with a thickest wall comprising support extrusion 250.

Figure 10:
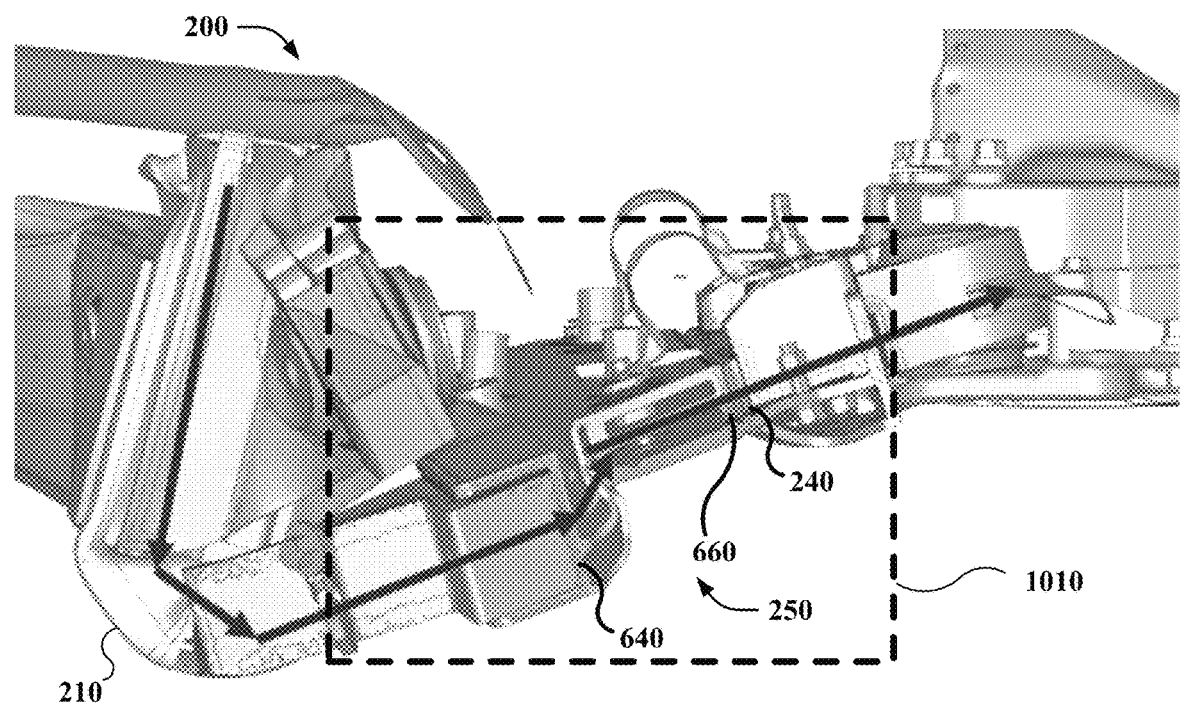
FIG. 10 illustrates a close-up, side view of the example, non-limiting subframe structure of FIG. 2 at a third time following the second time of FIG. 9, in accordance with one or more embodiments described herein.
Figure 11:
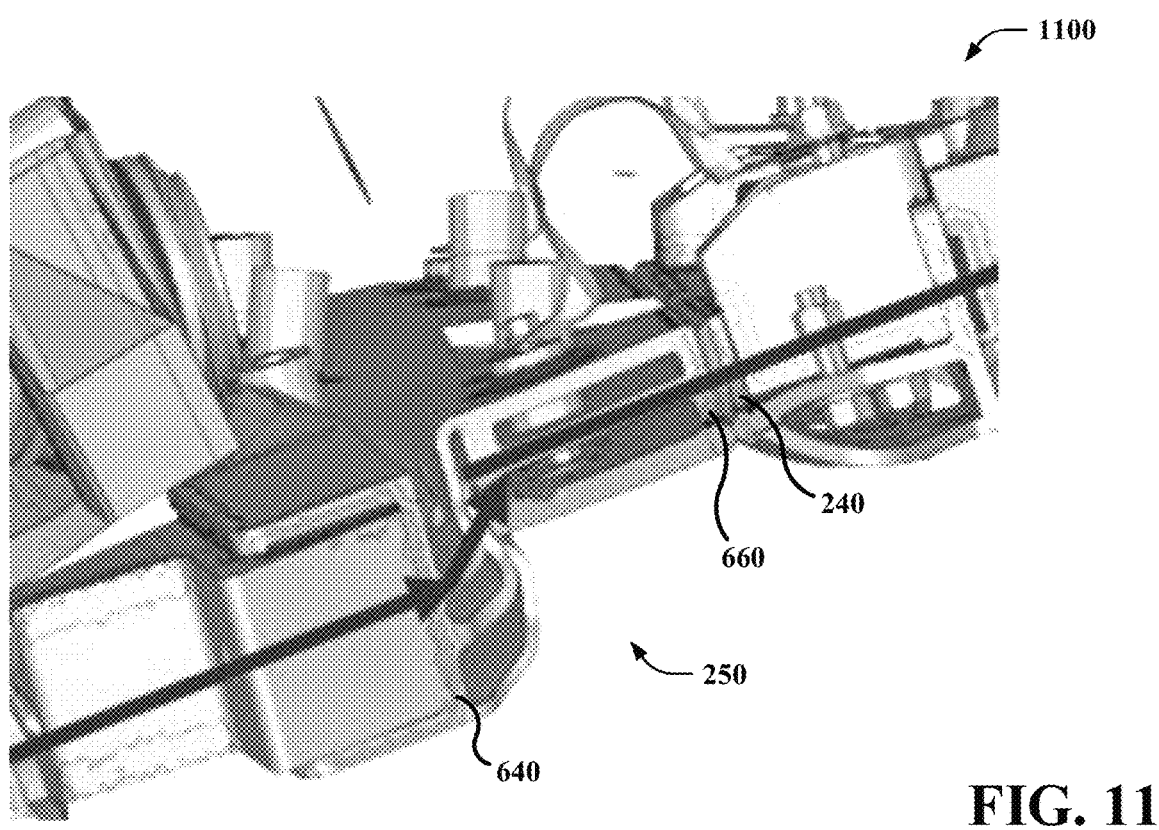
FIG. 11 illustrates a close-up, side view of the example, non-limiting subframe structure of FIG. 2 at the third time of FIG. 10, in accordance with one or more embodiments described herein.

FIG. 10 illustrates a side view depicting subframe structure 200 at a third time following the second time of FIG. 9 and after cessation of the impact forces F, in accordance with one or more embodiments described herein. For example, FIG. 10 can correspond to subframe structure 200 in a deformed state after cessation of the impact forces F of the offset deformable barrier approaching subframe structure 200 at approximately the 45-degree angle. FIG. 11 illustrates a close-up view 1100 depicting a region 1010 of subframe structure 200 comprising support extrusion 250 at the third time of FIG. 10. As shown by FIGS. 10-11, support extrusion 250 can deform in a controlled manner when subjected to impact forces F of a frontal crash. FIGS. 10-11 further show that support extrusion 250 can also remain coupled to rear crossmember 240 of subframe structure 200 when subjected to such impact forces F. By deforming in a controlled manner without detaching from rear crossmember 240, support extrusion 250 can facilitate absorbing such impact forces F to mitigate negative impacts of the frontal crash on occupants of user compartment 130 and/or vehicle components (e.g., a battery for powering vehicle propulsion) mounted behind the rear section 202 of subframe structure 200. Examples of such negative impacts that can be mitigated by support extrusion 250 deforming in a controlled manner can include, but not be limited to, the stacking up of vehicle components intervening between front section 110 and user compartment 130 of vehicle 100, intrusion of such vehicle components into user compartment 130 (e.g., occupant compartment intrusion), vehicle crash pulse, and other negative impacts.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

What has been described above include mere examples of a support extrusion for a subframe structure of a vehicle and methods of fabricating the same. It is, of course, not possible to describe every conceivable combination of components or methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A support extrusion for a subframe structure of a vehicle, the support extrusion comprising:
a multicell structure that facilitates coupling the support extrusion with a rear crossmember of the subframe structure, wherein the multicell structure comprises a front cell column and a rear cell column that intervenes between the front cell column and the rear crossmember in a longitudinal direction of the subframe structure, and wherein the front cell column comprises a trigger that facilitates plastically deforming the front cell column downward in a vertical direction of the subframe structure when subjected to impact forces of a frontal crash.

2. The support extrusion of claim 1, wherein the trigger comprises a curvature in a lower wall of the multicell structure within the front cell column that positions the lower wall within the front cell column below the lower wall within the rear cell column.

3. The support extrusion of claim 1, wherein the trigger comprises a curvature in an intermediate wall of the multicell structure within the front cell column that separates a plurality of cells comprising the front cell column in the vertical direction.

4. The support extrusion of claim 1, further comprising:
a wall segment intervening between an upper wall of the multicell structure within the front cell column and an intermediate wall of the multicell structure within the front cell column that vertically opposes the upper wall, wherein the wall segment longitudinally opposes the rear cell column and comprises a radius of curvature that facilitates substantially even distribution of the impact forces between the upper wall and the intermediate wall.

5. The support extrusion of claim 1, wherein a substantially horizontal wall of the multicell structure within the rear cell column comprises a thickness extending in the vertical direction of the subframe structure that exceeds a respective thickness of the substantially horizontal wall within the front cell column.

6. The support extrusion of claim 1, further comprising:
a bracket portion longitudinally opposing the rear cell column with respect to the front cell column, wherein the bracket portion facilitates coupling the support extrusion with a longitudinal member of the subframe structure.

7. The support extrusion of claim 6, wherein an upper wall of the multicell structure within the front cell column extends longitudinally from the bracket portion proximate to a midpoint of the bracket portion in the vertical direction.

8. The support extrusion of claim 1, wherein a lowest thickness extending in the vertical direction within the support extrusion corresponds with an upper wall of the multicell structure within the front cell column.

9. The support extrusion of claim 1, wherein a structural integrity of the rear cell column remains substantially intact when subjected to the impact forces.

10. The support extrusion of claim 1, further comprising:
a divider wall intervening between the front cell column and the rear cell column in the longitudinal direction, wherein the divider wall comprises a thickness extending in the longitudinal direction of the subframe structure that exceeds respective thicknesses of other walls comprising the support extrusion.

11. The support extrusion of claim 1, wherein the support extrusion is extruded in a transverse direction of the subframe structure that is orthogonal to the longitudinal direction.

12. The support extrusion of claim 1, wherein the support extrusion comprises an aluminum alloy.

13. A subframe structure for a vehicle, the subframe structure comprising:
a rear crossmember extending in a transverse direction of the subframe structure; and
a support extrusion comprising a multicell structure that facilitates coupling the support extrusion with the rear crossmember, wherein the multicell structure comprises a front cell column and a rear cell column that intervenes between the front cell column and the rear crossmember in a longitudinal direction of the subframe structure, wherein the front cell column comprises a trigger that facilitates plastically deforming the front cell column downward in a vertical direction of the subframe structure when subjected to impact forces of a frontal crash.

14. The subframe structure of claim 13, wherein the trigger comprises a curvature in a lower wall of the multicell structure within the front cell column that positions the lower wall within the front cell column below the lower wall within the rear cell column.

15. The subframe structure of claim 13, wherein the trigger comprises a curvature in an intermediate wall of the multicell structure within the front cell column that separates a plurality of cells comprising the front cell column in the vertical direction.

16. The subframe structure of claim 13, wherein the rear cell column remains coupled to the rear crossmember when subjected to the impact forces.

17. The subframe structure of claim 13, wherein the support extrusion further comprises a bracket portion longitudinally opposing the rear cell column with respect to the front cell column, and wherein the bracket portion facilitates coupling the support extrusion with a longitudinal member of the subframe structure.

18. A vehicle comprising:
a subframe structure with a support extrusion comprising a multicell structure that facilitates coupling the support extrusion with a rear crossmember of the subframe structure, wherein the multicell structure comprises a front cell column and a rear cell column that intervenes between the front cell column and the rear crossmember in a longitudinal direction of the subframe structure, and wherein the front cell column comprises a trigger that facilitates plastically deforming the front cell column downward in a vertical direction of the subframe structure when subjected to impact forces of a frontal crash.

19. The vehicle of claim 18, wherein the trigger comprises a curvature in a lower wall of the multicell structure within the front cell column that positions the lower wall within the front cell column below the lower wall within the rear cell column.

20. The vehicle of claim 18, wherein the trigger comprises a curvature in an intermediate wall of the multicell structure within the front cell column that separates a plurality of cells comprising the front cell column in the vertical direction.

* * * * *